United States Patent [19]

Tuzson

[11] 4,057,133

[45] Nov. 8, 1977

[54] SLIP SPEED RESPONSIVE DEVICE FOR CONTROLLING ENGAGEMENT OF FLUID ACTUATED CLUTCH

[75] Inventor: John J. Tuzson, Evanston, Ill.

[73] Assignee: Borg-Warner Corporation, Chicago, Ill.

[21] Appl. No.: 689,423

[22] Filed: May 24, 1976

[51] Int. Cl.² .......................................... F16D 43/284
[52] U.S. Cl. ............................ 192/103 F; 192/85 AA
[58] Field of Search ............ 192/102 F, 85 A, 85 AA, 192/109 F

[56] References Cited

U.S. PATENT DOCUMENTS

| 2,330,024 | 9/1943 | Beardsley | 192/85 A |
| 2,766,864 | 10/1956 | Schilling et al. | 192/85 A |
| 3,674,121 | 7/1972 | Copeland | 192/109 F |
| 3,752,280 | 8/1973 | Cheek | 192/103 F |

FOREIGN PATENT DOCUMENTS

| 268,810 | 7/1970 | U.S.S.R. | 192/85 AA |

*Primary Examiner*—Benjamin W. Wyche
*Attorney, Agent, or Firm*—Richard J. Schlott

[57] ABSTRACT

A fluid-actuated friction clutch having means for controlling engaging pressure responsive to the relative speed of the driving and driven elements. Such means includes a bleed passage of relieving fluid pressure and control means responsive to the relative rotation of the driving and driven elements for increasing the rate of bleed as the relative rotation decreases.

6 Claims, 4 Drawing Figures

SLIP SPEED RESPONSIVE DEVICE FOR CONTROLLING ENGAGEMENT OF FLUID ACTUATED CLUTCH

BACKGROUND OF THE INVENTION

This invention relates to fluid-actuated friction devices including selectively engageable friction members wherein the engaging pressure is decreased by a pressure control means responsive to slip speed, thereby reducing engagement shock.

Presently used selectively engageable multi-plate friction clutches or brakes have a first set of plates splined to a first torque transmitting member and a second set of plates interleaved with the first set and splined to a second torque receiving member. The plates are generally brought into engagement by means of a fluid-actuated clutch piston, and engagement shock is generally an important factor during dynamic engagement. Various methods to alleviate shock are in common use, including hydraulic oils and friction materials developed for desirable engagement characteristics and various devices used to control the rate of pressure rise. These methods provide conditions for clutch engagement which accomodate shock problems, but are not responsive to a change in parameters occurring in use or during the life of the mechanism.

During the engagement of the multi-plate clutch, the relative speed between the driving and driven plates, or slip speed, changes from maximum to zero. As the speed of the driven plates approaches that of the driving plates, a reduction in applied hydraulic pressure on the clutch piston would further reduce engagement shock. The proper moment for reduction of applied hydraulic pressure will vary with the duration of the engagement and cannot be pre-programmed.

A friction device having pressure control means responsive to slip speed for reducing the applied pressure as slip speed approaches zero would thus be quite useful and effective in minimizing engagement shock.

SUMMARY OF THE INVENTION

This invention relates to a fluid-actuated friction device including a selectively engageable multi-plate friction clutch wherein the engaging pressure is controlled by a shuttle valve responsive to engagement speed. The shuttle valve acts to decrease the engaging pressure as the relative speed of the driving and driven plates approaches zero. The speed-responsive control of pressure serves to further reduce engagement shock and prolong the life of the plates.

In the initial stages of clutch engagement, fluid pressure is delivered to the pressure face of a pressure-responsive clutch piston. The clutch piston moves to engage a multi-plate friction clutch having interleaved driving and driven elements. During the engagement, the relative speed between the driving and driven plates is reduced from maximum at the beginning of engagement to zero at complete engagement or lock-up.

In the present invention a shuttle valve is provided, including a shuttle spool disposed in a cylinder, said cylinder having vent passages at each end of the cylinder in communication with the apply face of the clutch piston, a bleed passage, and supply passages in communication with the clutch piston pressure face. The shuttle spool is adapted to block and unblock the main bleed passage and selectively control the flow of pressurized fluid by way of the main bleed passage. The vent passages to the cylinder end are not blocked by the shuttle spool.

In the initial stages of clutch engagement, pressurized fluid delivered to the clutch piston pressure face enters the shuttle valve cylinder through the supply passages. The shuttle spool blocks the main bleed passage, and the pressurized fluid exits the cylinder by way of the vent passages. The vent passages are alternately blocked and unblocked by a slotted plate rotating at a frequency which decreases with the decrease in relative speed, alternately pressurizing and venting the shuttle valve cylinder ends. At high relative speeds, the shuttle spool senses alternating end pressures at a high frequency rate such that the shuttle speed cannot fully respond. The shuttle spool, having no more than a dithering motion, continues to block the main bleed passage and prevent bleeding of the pressurized fluid.

As the relative speed approaches zero, the pressurizing-venting cycle decreases in frequency and the pressure imbalance on the ends of the shuttle spool is thus sustained for greater periods of time, becoming sufficient in duration to impart greater shuttle motion, unblock the main bleed passage and permit bleeding of the pressurized fluid.

The engagement pressure is thus reduced at a rate dependent upon engagement speed, and engagement shock is effectively reduced.

These and other features and advantages of the invention will become apparent by reference to the following specification and drawings.

DESCRIPTION OF THE PREFERRED EMBODIMENTS

Figure 1:
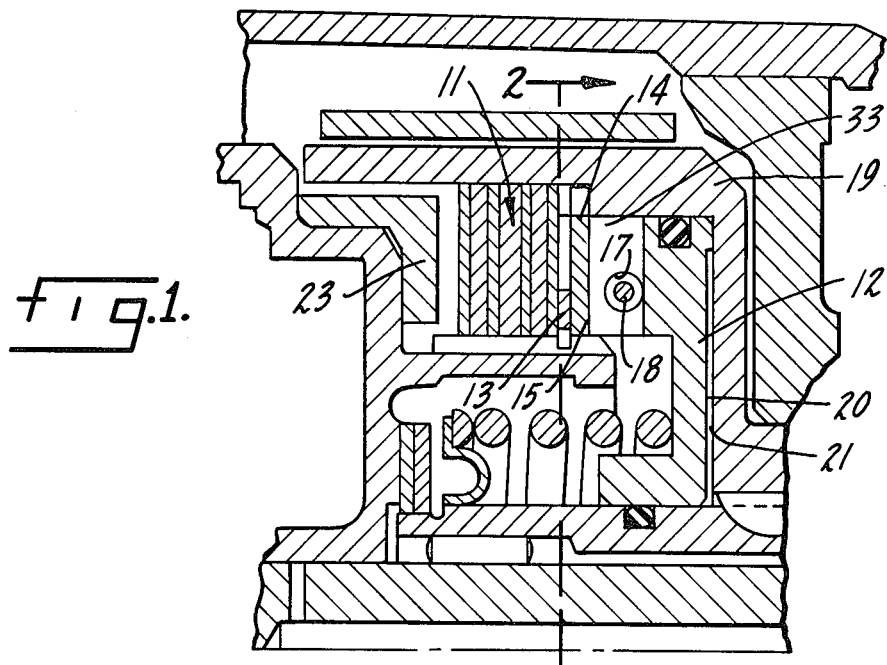
FIG. 1 is a sectional view of a portion of a clutch showing the shuttle valve means positioned in the rotatable clutch piston.

Referring to the drawings, in FIG. 1 there is shown in sectional view a portion of a clutch including the multi-plate clutch pack 11 which is engageable by means of clutch piston 12, a segmented drive plate 13, a separator plate 14 secured to the apply face 15 of clutch piston 12, a shuttle valve cylinder 17 and shuttle valve spool 18. Clutch piston 12 is movably mounted within the drum 19, and the clutch piston pressure face 20 and drum 19 define a pressure chamber 21, which is connected by passage 22 to a pressure source (not shown).

During engagement, apply pressure is admitted to chamber 21. The piston will move longitudinally to engage the segmented drive plate 13, pushing the elements together against the backing member 23, to obtain lock up so that torque may be transmitted.

Figure 2:
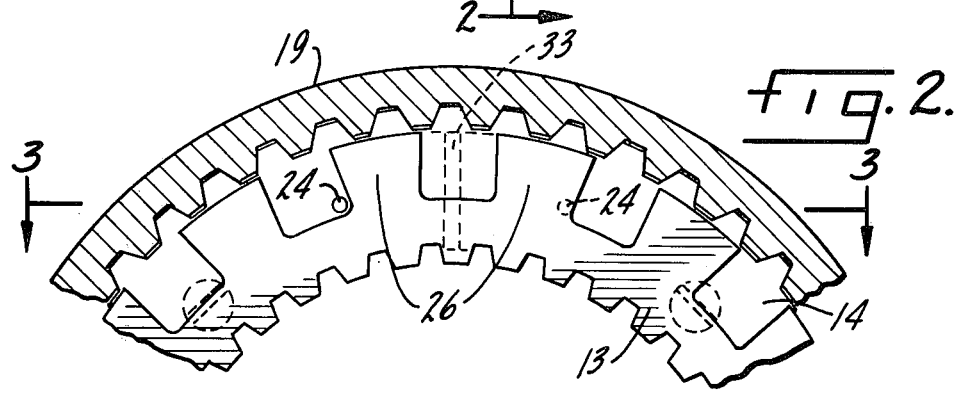
FIG. 2 is a sectional view along lines 2—2 of FIG. 1, showing the segmented drive plate and the separator plate.
Figure 3:
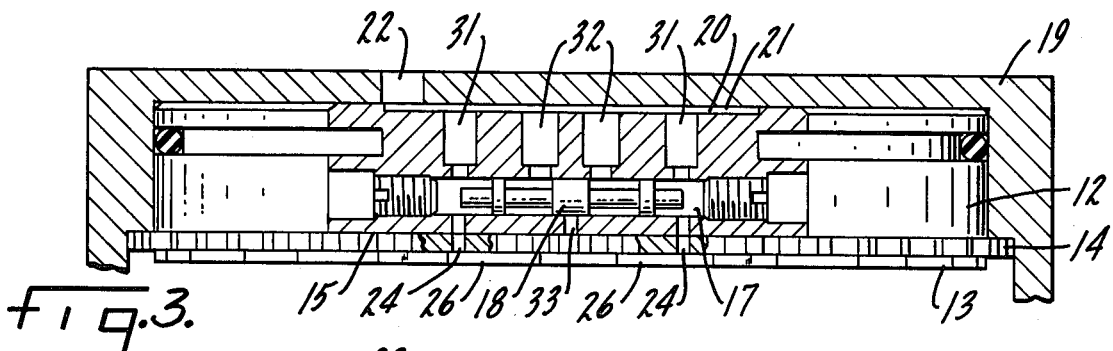
FIG. 3 is a fragmentary sectional view along 3—3 of FIG. 2 showing the shuttle valve spool in a centered position.

The operation of the shuttle valve means will be apparent from consideration of FIGS. 2 and 3.

Figure 4:
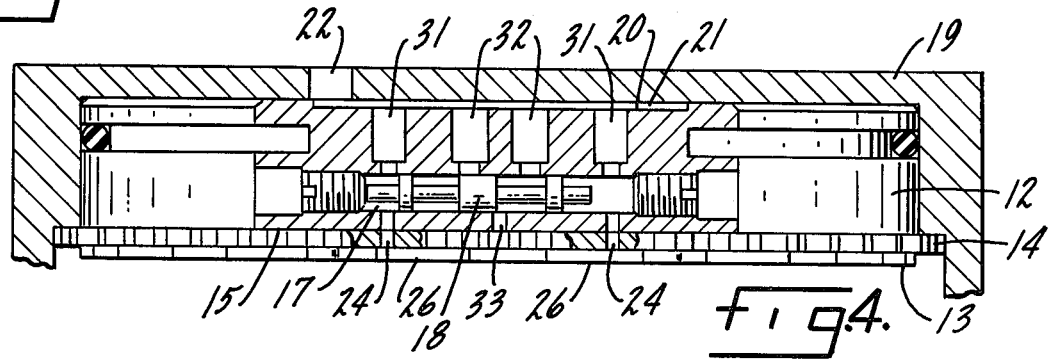
FIG. 4 is a fragmentary sectional view similar to FIG. 3 showing the shuttle valve spool displaced to its extreme position.

In FIG. 2 there is shown the segmented drive plate 13 and the separator plate 14, with vent passages 24 in the face of the separator plate 14. As the segmented drive plate 13 rotates relative to the separator plate, vent passages 24 are alternately blocked and vented. The spacing of segments 26 in relation to the two vent passages 24 is such that vent passages 24 cannot be blocked simultaneously. It will be apparent that blocking of one vent passage 24 will prevent flow of pressurized fluid from one shuttle valve cylinder end, thus applying an unbalanced pressure condition to the shuttle valve spool ends. The shuttle valve spool will thus be induced to move out of the centered position shown in FIG. 3 and into the appropriate extreme position, as shown in FIG. 4. When the one vent passage is unblocked by rotation of the segmented drive plate 13, the alternate vent passage is blocked, thus reversing the direction of the unbalanced force on the shuttle spool, moving it through the centered position to the opposite extreme position.

In FIG. 3 there is shown in cross section the shuttle valve cylinder 17 and shuttle valve spool 18. The shuttle valve cylinder is supplied with pressurized fluid by means of supply passages 31 and 32 in communication with the pressure chamber 21 through the clutch pressure face 20. Pressurized fluid is bled from the cylinder ends by way of vent passages 24 passing through the clutch apply face 15 and the separator plate 14. The main escape of pressurizedfluid is by way of the main bleed passage 33, passing through the rim of the clutch piston. In the centered position, FIG. 3, the shuttle valve spool 18 blocks the main bleed passage 33, allowing a continuous flow of fluid out of the pressure chamber 21 only by way of supply passages 31 and vent passages 24. When the shuttle valve spool is in extreme position as shown in FIG. 4, pressurized fluid is bled from the chamber 21 by way of supply passages 32 and main bleed passage 33.

In operation, pressure is applied to the clutch pressure chamber 21 by way of passage 22. A portion of the pressurized fluid flows through the shuttle valve cylinder ends by way of supply passages 31, and out of the cylinder ends by way of vent passages 24. In the initial stages of engagement, segmented drive plate 13 is in rapid rotation relative to the separator plate 14, and vent passages 24 are thus blocked and unblocked with high frequency, imparting an unbalanced pressure alternately to each end of the shuttle valve at a very high rate. The pressure pulses will be of insufficient duration to move the shuttle valve spool out of the centered position, and at most only a slight dithering motion will be present, insufficient to unblock the main bleed passage 33.

As engagement increases, relative motion between the segmented drive plate 13 and the separator plate 14 decreases, thus increasing the duration of the pressure pulses alternating at the ends of the shuttle valve spool by slowing the rate of blocking and unblocking of the vent passages 24. Length of travel of the shuttle spool will be increased to briefly unblock the main bleed passage 33 and partially relieve the apply pressure in chamber 21. The duration of bleed will increase as slip speed continues to decrease, and engagement shock will be markedly lessened as lock-up is achieved.

While certain embodiments of the invention have been described in detail, it will be apparent to those skilled in the art that the embodiments are capable of a wide variety of modification as to the arrangement, disposition and form of the parts and/or basic elements without departing from the principles of the present invention. The foregoing description is therefore to be considered exemplary rather than limiting, and the true scope of the invention is that defined in the following claims.

I claim:

1. In a fluid actuated friction clutch having rotatable driving and driven elements and a fluid pressure responsive piston for engaging said elements, said piston and one of said elements forming a chamber adapted to receive fluid under pressure, the improvement comprising a bleed passage communicating with said chamber, and fluid control means responsive to relative rotation of said elements for increasing the rate of bleed from said chamber as the relative rotation of said elements decreases, said fluid control means including a cylinder communicating with said chamber, spaced vent passages communicating with said cylinder, a fluid pressure responsive shuttle valve movable in said cylinder between positions blocking and unblocking said bleed passage, and means rotatable in response to rotation of one of said elements for alternately blocking said vent passages, thereby developing fluid pressure forces acting on said shuttle valve.

2. In a fluid actuated friction clutch having rotatable driving and driven elements and a fluid pressure responsive piston for engaging said elements, said piston and one of said elements defining a chamber adapted to receive fluid under pressure; the improvement wherein said piston defines a cylinder in fluid communication with said chamber, a pair of spaced vent passages, and a bleed passage intermediate said vent passages, said passages in fluid communication with said cylinder, a fluid pressure responsive shuttle valve slidable in said cylinder between positions blocking and unblocking said bleed passage, and a segmented plate rotatable with one of said elements, said plate and said vent passages constructed and arranged such that said plate alternately blocks and unblocks said vent passage in response to rotation of its associated element relative to the other of said elements.

3. The invention of claim 2, said shuttle valve and said bleed passage constructed and arranged such that said bleed passage is blocked in response to relative rotation of said elements above a predetermined speed.

4. The invention of claim 3, said shuttle valve and bleed passage being constructed and arranged such that said bleed passage is increasingly unblocked in response to decreasing relative rotation of said elements below said predetermined speed.

5. In a hydraulically actuated, multi-plate friction clutch comprising a rotatable clutch drum, an engageable and releasable multi-plate clutch pack, a fluid pressure responsive clutch piston for engaging and releasing said multi-plate clutch pack forming with said drum a chamber adapted to receive fluid under pressure, the improvement wherein said clutch piston contains a shuttle valve comprising a cylinder and a shuttle valve spool, passage means connecting said chamber with said shuttle valve, bleed passage means adapted to bleed pressurized fluid from the central area of the cylinder through the clutch rim, said shuttle valve spool being adapted to block and unblock said bleed passage means in response to unbalanced fluid pressures in the cylinder ends, two vent passage means adapted to vent the cylinder ends through the face of the clutch piston, and a segmented drive plate located co-axially in rotational relationship with the separator plate adapted to alternately block and unblock each said vent passage means during the relative rotation thereof and to block one of said vent passage means when in fixed non-rotational relationship with said separator plate.

6. In a hydraulically actuated, multi-plate friction clutch comprising a rotatable drum, an engageable and releasable multi-plate clutch pack, a fluid-pressure responsive piston for engaging and releasing said multi-plate clutch pack, said piston forming with said drum or chamber adapted to receive fluid under pressure; the improvement wherein a reduction in fluid pressure is accomplished by bleeding fluid from said chamber through a bleed passage means under control of a shuttle valve contained within the piston, said shuttle valve being adapted to increase the rate of bleeding responsive to the reduction in relative rotational speeds between said piston and an adjacently-located, segmented drive plate during clutch engagement.

* * * * *